(12) United States Patent
Tsorng et al.

(10) Patent No.: US 12,513,849 B2
(45) Date of Patent: Dec. 30, 2025

(54) RISER BRACKET WITH HINGE AND SERVER SYSTEM INCLUDING SAME

(71) Applicant: Quanta Computer Inc., Taoyuan (TW)

(72) Inventors: Yaw-Tzorng Tsorng, Taoyuan (TW); Jen-Jia Liou, Taoyuan (TW); Chia-Lin Tsai, Taoyuan (TW); Fu-Jun Yu, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 175 days.

(21) Appl. No.: 18/378,446

(22) Filed: Oct. 10, 2023

(65) Prior Publication Data

US 2025/0120037 A1    Apr. 10, 2025

(51) Int. Cl.
*H05K 7/14*    (2006.01)
*G06F 1/18*    (2006.01)

(52) U.S. Cl.
CPC ........... *H05K 7/1489* (2013.01); *G06F 1/185* (2013.01); *G06F 1/186* (2013.01); *H05K 7/1408* (2013.01); *H05K 7/1418* (2013.01); *H05K 7/1487* (2013.01)

(58) Field of Classification Search
CPC .. H05K 7/1402; H05K 7/1404; H05K 7/1405; H05K 7/1408; H05K 7/1424; H05K 7/1425; H05K 7/1431; H05K 7/1485; H05K 7/1487; H05K 7/1488; H05K 7/1489; H05K 7/1491; H05K 5/0217; H05K 5/30; H05K 5/0286; H05K 5/0291; H05K 5/0221; G06F 1/16; G06F 1/181; G06F 1/183; G06F 1/185; G06F 1/186; G06F 1/187; G06F 15/16; G06F 15/161; H01R 12/7029; H01R 12/7023; H01R 12/7058; H01R 12/721; H01R 12/737; H01R 13/6275; H01R 13/639; H01R 4/50; H01R 43/26; H01R 13/629; H02G 3/14

See application file for complete search history.

(56) References Cited

U.S. PATENT DOCUMENTS

| | | | | |
|---|---|---|---|---|
| 2,057,269 A | * | 10/1936 | Schreiber | E05D 7/1005 16/263 |
| 5,544,006 A | * | 8/1996 | Radloff | G06F 1/186 361/756 |
| 5,935,227 A | * | 8/1999 | Phan | G06F 1/18 710/100 |
| 5,982,627 A | * | 11/1999 | Haughton | G06F 1/185 206/706 |

(Continued)

*Primary Examiner* — Adrian S Wilson
*Assistant Examiner* — Gage Crum
(74) *Attorney, Agent, or Firm* — NIXON PEABODY LLP

(57) ABSTRACT

A server system is disclosed. The server system includes a riser bracket having a slot and an internal space, the internal space being an operation space for allowing a physical user action; a Peripheral Component Interconnect Express (PCIE) card inserted in the slot of the riser bracket, the PCIE card having a power connector, the power connector being configured to receive a power cable, the internal space being adjacent to the power connector; and a hinge mechanically coupled to the riser bracket near the power connector, the hinge being pivotable between a first position and a second position, the hinge covering the internal space in the first position, the hinge uncovering the internal space in the second position.

13 Claims, 15 Drawing Sheets

(56) References Cited

U.S. PATENT DOCUMENTS

| | | | | |
|---|---|---|---|---|
| 6,000,767 | A * | 12/1999 | Liu | G06F 1/181 |
| | | | | 361/725 |
| 6,198,040 | B1 * | 3/2001 | Desousa | H02G 3/14 |
| | | | | 174/375 |
| 6,960,720 | B2 * | 11/2005 | Wen-Lung | G06F 1/186 |
| | | | | 361/801 |
| 7,561,440 | B2 * | 7/2009 | Dai | H05K 7/1408 |
| | | | | 361/740 |
| 7,990,732 | B2 * | 8/2011 | Kuo | G06F 1/183 |
| | | | | 361/810 |
| 9,310,853 | B2 * | 4/2016 | Yu | H05K 7/1487 |
| 10,624,226 | B1 * | 4/2020 | Alvarado | H05K 7/1408 |
| 11,262,812 | B2 * | 3/2022 | Chen | G06F 1/186 |
| 2007/0242442 | A1 * | 10/2007 | Dai | H05K 7/1408 |
| | | | | 361/801 |
| 2012/0252246 | A1 * | 10/2012 | Cox | H01R 13/64 |
| | | | | 439/259 |
| 2013/0027875 | A1 * | 1/2013 | Zhu | H05K 7/1487 |
| | | | | 361/759 |
| 2017/0135256 | A1 * | 5/2017 | Chen | H05K 13/04 |
| 2019/0215982 | A1 * | 7/2019 | Chen | H05K 7/1492 |
| 2021/0365084 | A1 * | 11/2021 | Chang | G06F 13/4004 |
| 2021/0373616 | A1 * | 12/2021 | Chen | G06F 1/185 |
| 2021/0410335 | A1 * | 12/2021 | Tsorng | G06F 1/185 |
| 2022/0117111 | A1 * | 4/2022 | Tseng | G06F 1/186 |
| 2023/0062355 | A1 * | 3/2023 | Zhang | G06F 1/186 |
| 2024/0345637 | A1 * | 10/2024 | Wang | G06F 1/185 |
| 2024/0381561 | A1 * | 11/2024 | Tsai | H05K 7/1489 |
| 2025/0113456 | A1 * | 4/2025 | Huang | H05K 7/1485 |

* cited by examiner

RISER BRACKET WITH HINGE AND SERVER SYSTEM INCLUDING SAME

FIELD OF THE INVENTION

The present invention relates generally to a riser bracket with a hinge, and more specifically, to a server system with a riser bracket with a hinge that can cover or uncover an internal space for accessing a power connector of a Peripheral Component Interconnect Express (PCIE) card installed to the riser bracket for easy connection of a power cable without interference.

BACKGROUND OF THE INVENTION

Referring to FIG. 1A, in general, when a PCIE card 100 is installed to a riser bracket 200 of a server system, the riser bracket 200 covers most portions of the PCIE card 100, except for a portion of the PCIE card 100 where a power connector 101 is located, to protect the PCIE card 100 from the external environment. For example, power cables 300 are connected to the power connector 101 of the PCIE card 100 inserted in a slot of the riser bracket 200. However, as exemplified in FIG. 1B, when connecting the power cables 300 to the power connector 101, a hand of a technician holding a plug 301 of the power cables 300 may be interfered by the riser bracket 200. That is because an internal space near the power connector 101 of the PCIE card 100 installed to the riser bracket 200 is generally obscured by the chassis of the riser bracket 200. Therefore, in the prior art, due to the insufficient operation space provided for connection of the power cables 300 to the power connector 101, it may be difficult for fingers of the technician to hold the plug 301 of the power cables securely when the technician tries to reach the power connector 101 with the fingers holding the plug 301.

Therefore, a need exists for a riser bracket with a structure allowing a sufficient operation space so that a technician can easily access a power connector of a PCIE card installed to a riser bracket of a server system without being interfered by the chassis of the riser bracket. A need also exists for a mechanism allowing easy access to the operation space necessary for connection of the power cables to the PCIE card in the server system.

SUMMARY OF THE INVENTION

The term embodiment and like terms, e.g., implementation, configuration, aspect, example, and option, are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter. This summary is also not intended to be used in isolation to determine the scope of the claimed subject matter. The subject matter should be understood by reference to appropriate portions of the entire specification of this disclosure, any or all drawings, and each claim.

In view of the above-described problem with the conventional design of riser brackets that does not provide a sufficient operation space for easily connecting or disconnecting cables to/from a PCIE card installed therein, the present application discloses a riser bracket with a hinge that is configured to provide a sufficient operation space adjacent to a power connector of the PCIE card so that a technician can reach the power connector easily for connection or disconnection of cables.

According to certain aspects of the present disclosure, a server system is disclosed. According to various embodiments, the server system includes a riser bracket having a slot and an internal space. The internal space is an operation space for allowing a physical user action. A Peripheral Component Interconnect Express (PCIE) card is inserted in the slot of the riser bracket, and the PCIE card has a power connector. The power connector is configured to receive a power cable, and the internal space is adjacent to the power connector. A hinge is mechanically coupled to the riser bracket near the power connector, and the hinge is pivotable between a first position and a second position. The hinge covers the internal space in the first position, and the hinge uncovers the internal space in the second position.

In various embodiments, the hinge includes a first leaf having a movable end and a first hinged end; and a second leaf having a fixed end and a second hinged end. The first hinged end is rotatably coupled with the second hinged end, and the fixed end is mechanically attached to the riser bracket near the power connector.

In various embodiments, the movable end covers the internal space in the first position, and the movable end uncovers the internal space in the second position.

In various embodiments, the first leaf and the second leaf have different shapes and different dimensions.

In various embodiments, the first leaf is bent to have a first plate having the movable end and a second plate extending generally perpendicular from one end of the first plate, the second plate having the first hinged end.

In some embodiments, the first plate has a first hole configured to receive a first fastener. In some embodiments, the first hole is threaded, and the first fastener includes a screw.

In various embodiments, the second plate further has a first knuckle and a second knuckle at the first hinged end such that the first knuckle and the second knuckle are spaced.

In various embodiments, the second leaf has a generally planar surface with at least a second hole and a third hole configured to receive a second fastener and a third fastener, respectively. In some embodiments, the second fastener and the third fastener include rivets and are different from the first fastener.

In various embodiments, the second leaf further has a third knuckle at the second hinged end, and the third knuckle is positioned between the first knuckle and the second knuckle. In some embodiments, the first leaf is rotatably coupled to the second leaf by a pin passing through the first, second, and third knuckles.

In various embodiments, the second leaf is fixedly coupled to a top side of the riser bracket via the second and third fasteners.

In various embodiments, the first leaf is releasably coupled to the server system via the first fastener passing through the first hole and releasably coupled to a receiving hole. In some embodiments, the server system further includes a bracket coupled to a portion of the server system, and the bracket includes the receiving hole configured to receive the first fastener. In some embodiments, the receiving hole includes a threaded nut.

In various embodiments, the first leaf is coupled to the server system via the first fastener while the hinge is in the first position. In various embodiments, the first fastener is released from the receiving hole such that the first leaf is not coupled to the server system so as to place the hinge in the second position.

According to other aspects of the present disclosure, a server system is disclosed. According to various embodiments, the server system includes a Peripheral Component Interconnect Express (PCIE) card; a riser bracket having a slot in which the PCIE card is received, the PCIE card including a power connector configured to receive a power cable; and a hinge coupled to a portion of the riser bracket near the power connector. The hinge is pivotable between a first position and a second position. A portion of the PCIE card is covered in the first position, the portion of the PCIE card being near the power connector. The hinge exposes the portion of the PCIE card in the second position.

According to various embodiments, the hinge includes a first leaf and a second leaf rotatably coupled with the first leaf. In some embodiments, the second leaf is fixedly attached to the riser bracket near the power connector, and the first leaf is rotatable to place the hinge in the first or second position. In some embodiments, the first leaf is releasably coupled to a portion of the server system such that the hinge is in the first position. In some embodiments, the first leaf is uncoupled from the portion of the server system to place the hinge in the second position.

According to other aspects of the present disclosure, a method for connecting a power cable to a power connector of a Peripheral Component Interconnect Express (PCIE) card within a chassis of a server system is disclosed. According to various embodiments, the method includes pivoting a hinge attached to a riser bracket, the riser bracket including a slot configured to receive the PCIE card, from a first position to a second position. A portion of the PCIE card adjacent to the power connector is exposed when the hinge is in the second position. The method further includes accessing an internal space near the exposed portion of the PCIE card with a plug of the power cable while the hinge is in the second position; connecting the plug to the power connector of the PCIE card while the hinge is in the second position; and pivoting the hinge from the second position to the first position when the plug is connected to the power connector of the PCIE card. The portion of the PCIE card is covered by the hinge in the first position. The portion of the PCIE card is not accessible while the hinge is in the first position.

According to various embodiments, the method further includes unfastening a fastener passing through a first leaf of the hinge and releasably coupled to a receiving hole to pivot the hinge from the first position to the second position. A second leaf of the hinge is fixedly attached to a portion of the riser bracket. According to various embodiments, the method further includes fastening the fastener into the receiving hole, following the pivoting of the hinge from the second position to the first position.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims. Additional aspects of the disclosure will be apparent to those of ordinary skill in the art in view of the detailed description of various embodiments, which is made with reference to the drawings, a brief description of which is provided below.

BRIEF DESCRIPTION OF THE DRAWINGS

The disclosure, and its advantages and drawings, will be better understood from the following description of representative embodiments together with reference to the accompanying drawings. These drawings depict only representative embodiments, and are therefore not to be considered as limitations on the scope of the various embodiments or claims.

Figure 1A:
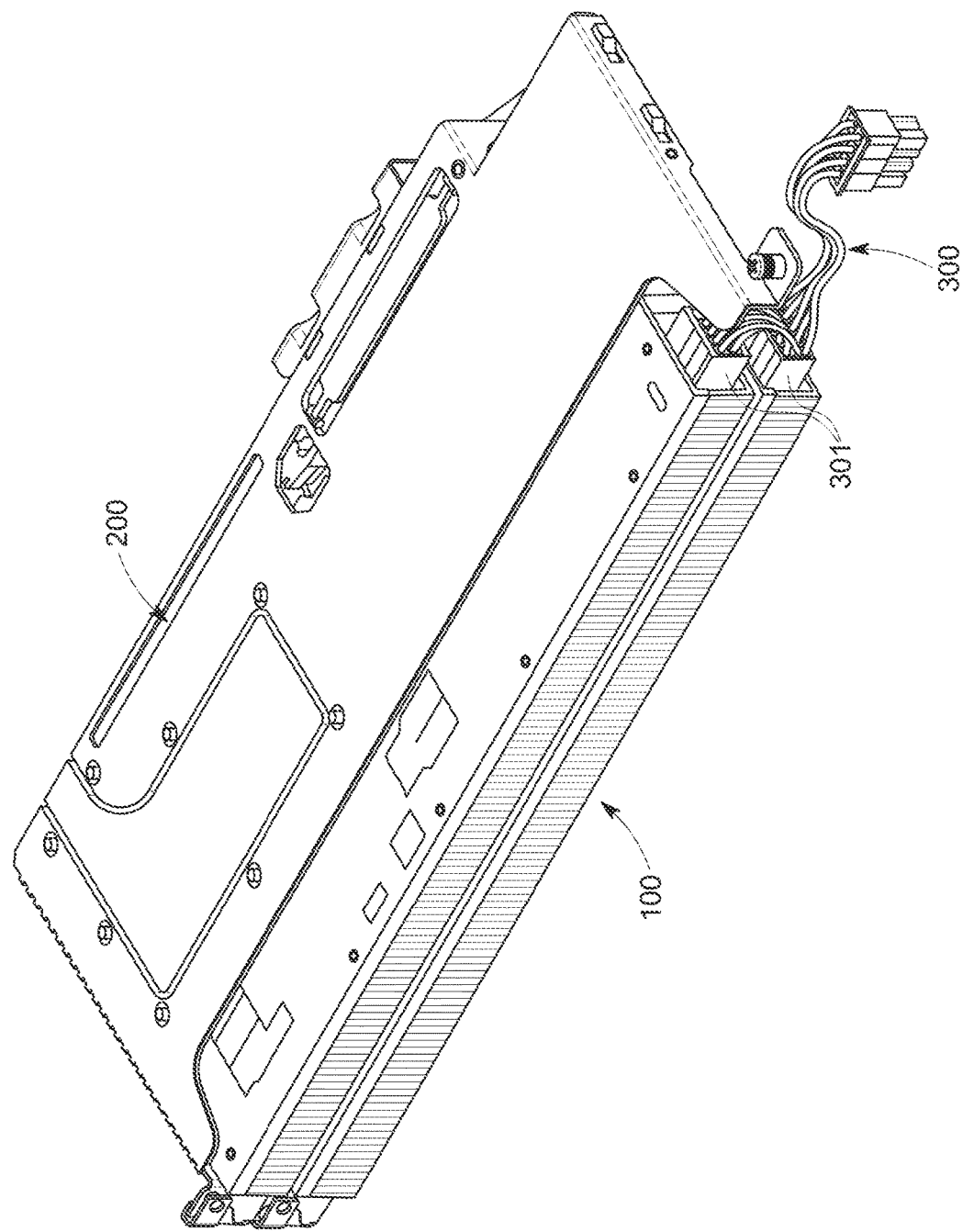
FIG. 1A is a perspective view of a prior art riser bracket with a PCIE card inserted therein.
Figure 1B:
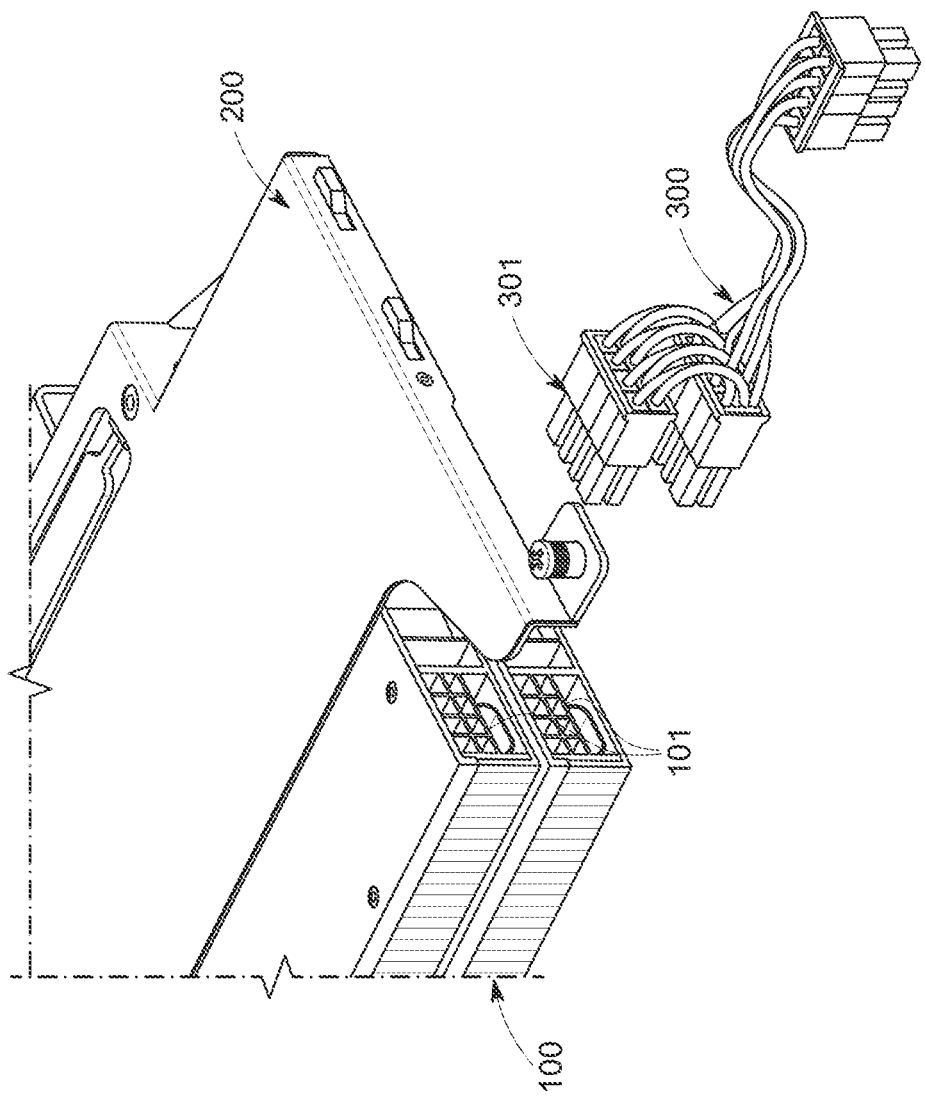
FIG. 1B is a perspective view of a portion of the prior art riser bracket shown in FIG. 1A, illustrating the riser bracket causing interference when cables are installed to a power connector of the PCIE card.

Elements in the figures are illustrated for simplicity and clarity and have not necessarily been drawn to scale. For example, the dimensions and/or relative positioning of some of the elements in the figures may be exaggerated relative to other elements to help improve understanding of various features.

While the present disclosure is susceptible to various modifications and alternative forms, specific implementations have been shown by way of example in the drawings and will be described in further detail herein. It should be understood, however, that the present disclosure is not intended to be limited to the particular forms disclosed. Rather, the present disclosure is to cover all modifications, equivalents, and alternatives falling within the spirit and scope of the present disclosure as defined by the appended claims.

DETAILED DESCRIPTION

Various embodiments are described with reference to the attached figures, where like reference numerals are used throughout the figures to designate similar or equivalent elements. The figures are not necessarily drawn to scale and are provided merely to illustrate aspects and features of the present disclosure. Numerous specific details, relationships, and methods are set forth to provide a full understanding of certain aspects and features of the present disclosure, although one having ordinary skill in the relevant art will recognize that these aspects and features can be practiced without one or more of the specific details, with other relationships, or with other methods. In some instances, well-known structures or operations are not shown in detail for illustrative purposes. The various embodiments disclosed herein are not necessarily limited by the illustrated ordering of acts or events, as some acts may occur in different orders and/or concurrently with other acts or events. Furthermore, not all illustrated acts or events are necessarily required to implement certain aspects and features of the present disclosure.

For purposes of the present detailed description, unless specifically disclaimed, and where appropriate, the singular includes the plural and vice versa. The word "including" means "including without limitation." Moreover, words of approximation, such as "about," "almost," "substantially," "approximately," and the like, can be used herein to mean "at," "near," "nearly at," "within 3-5% of," "within acceptable manufacturing tolerances of," or any logical combination thereof. Similarly, terms "vertical" or "horizontal" are intended to additionally include "within 3-5% of" a vertical or horizontal orientation, respectively. Additionally, words of direction, such as "top," "bottom," "left," "right," "above," and "below" are intended to relate to the equivalent direction as depicted in a reference illustration; as understood contextually from the object(s) or element(s) being referenced, such as from a commonly used position for the object(s) or element(s); or as otherwise described herein.

Figure 2A:
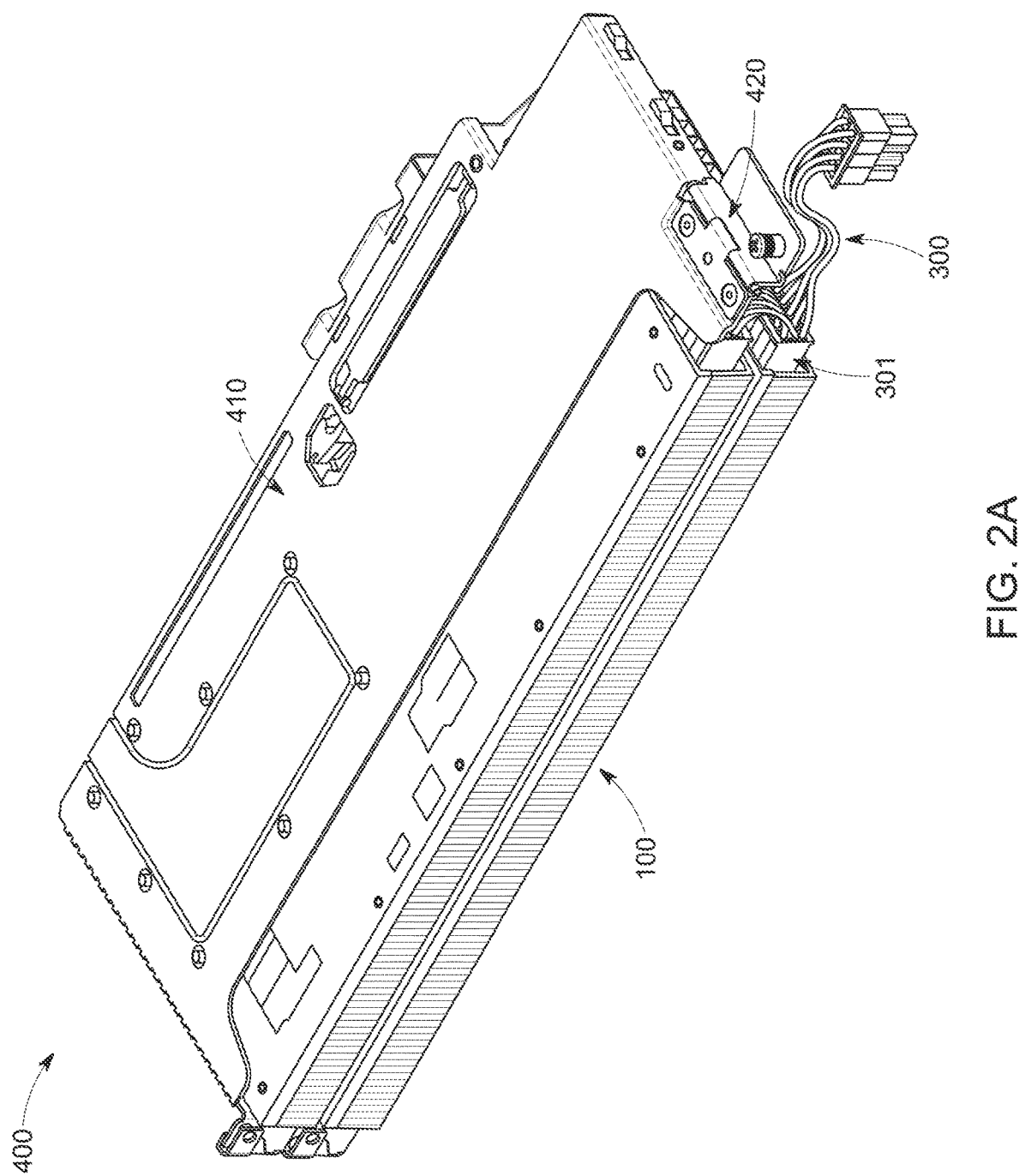
FIG. 2A is a perspective view of a riser bracket, according to certain aspects of the present disclosure.

A flippable riser bracket 400 according to various embodiments of the present invention is shown in FIG. 2A. According to various embodiments, the flippable riser bracket 400 includes a riser bracket 410 and a hinge 420. In FIG. 2A, the flippable riser bracket 400 encloses PCIE cards 100, each PCIE card receiving a plug 301 of power cables 300. Detailed structure and operation of the flippable riser bracket 400 are described below.

Figure 2B:
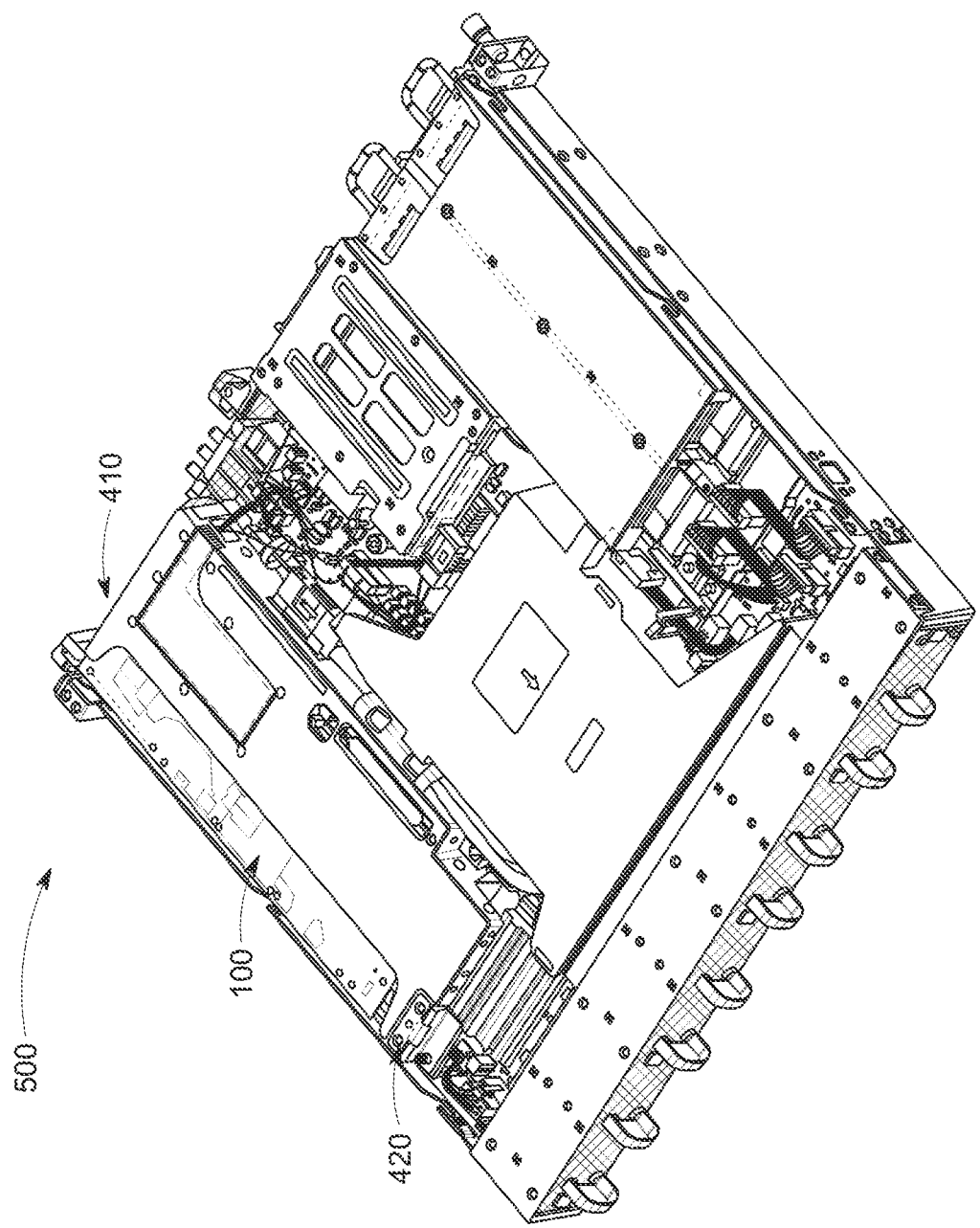
FIG. 2B is a perspective view of a server system including the riser bracket shown in FIG. 2A, according to certain aspects of the present disclosure.

An exemplary server system 500 including the flippable riser bracket 400, according to various embodiments of the present invention, is shown in FIG. 2B. The flippable riser bracket 400 has a slot 415 or slots 415 in which the PCIE card 100 is inserted.

Figure 3B:
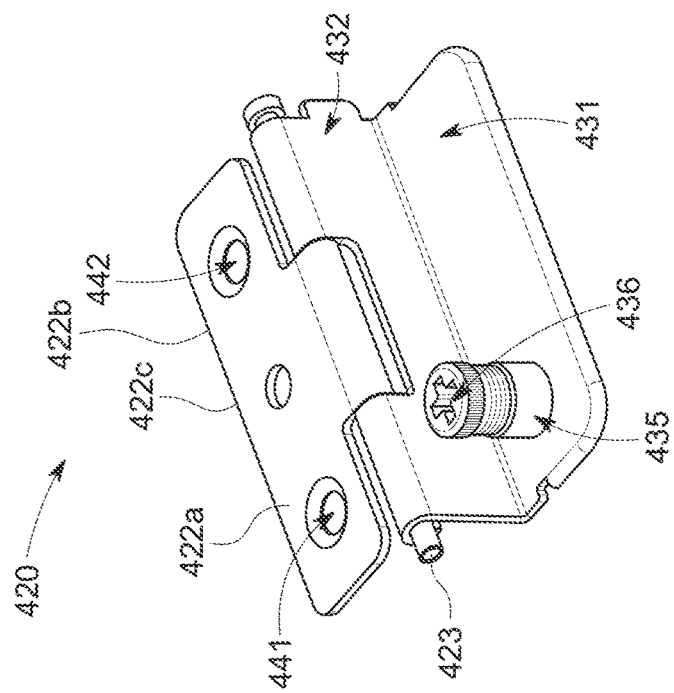
FIG. 3B is a perspective view of the assembled hinge shown in FIG. 3A.
Figure 3A:
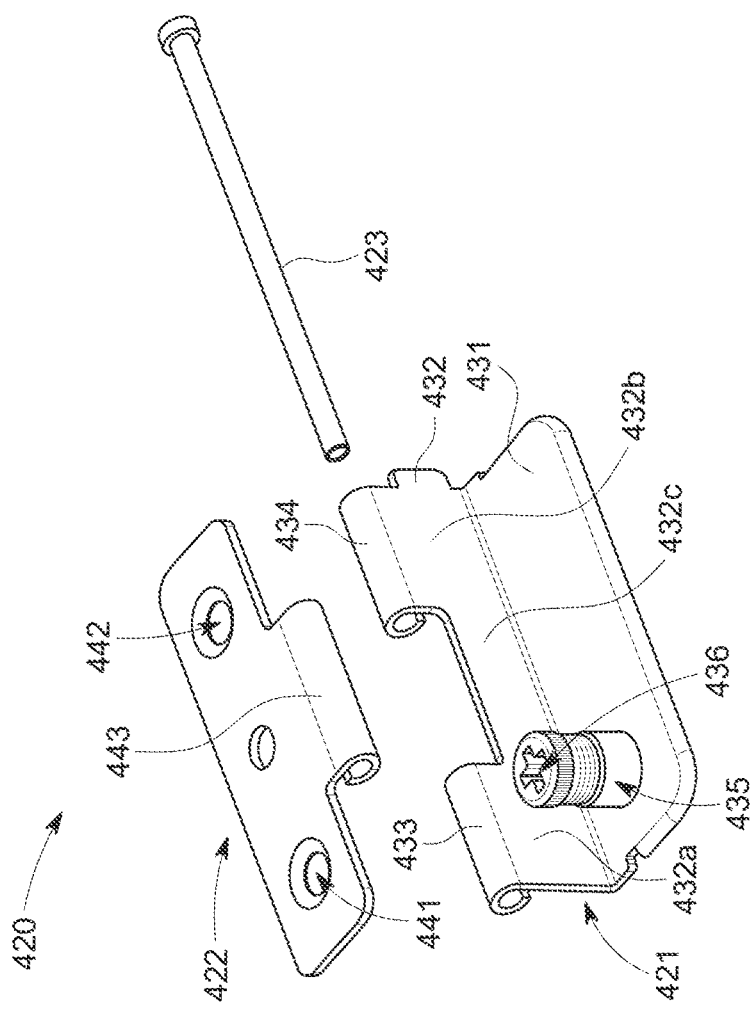
FIG. 3A is an exploded view of a hinge, according to certain aspects of the present disclosure.

The structure of the hinge 420 is described, referring to FIGS. 3A and 3B. According to various embodiments, the hinge 420 includes a first leaf 421 and a second leaf 422. The first leaf 421 is bent to have a first plate 431 and a second plate 432 extending generally perpendicular from one end of the first plate 431. In some embodiments, the first plate 431 has a first hole 435 configured to receive a first fastener 436. In some embodiments, the first hole 435 is elongated or protrudes from the surface of the first plate 431. In some embodiments, the first hole 435 is threaded, and the first fastener 436 is a threaded fastener, such as a screw or a bolt.

In some embodiments, the second plate 432 has a first portion 432a and a second portion 432b with a same height, as shown in FIG. 3A. The second plate 432 further has a third portion 432c between the first portion 432a and the second portion 432b, as shown in FIG. 3A. In some embodiments, a height of the third portion 432c is smaller than the height of the first and second portions 432a, 432b. In some embodiments, the second plate 432 further has a first knuckle 433 at an edge of the first portion 432a and a second knuckle 434 at an edge of the second portion 432b such that the first knuckle 433 and the second knuckle 434 are spaced.

Figure 5A:
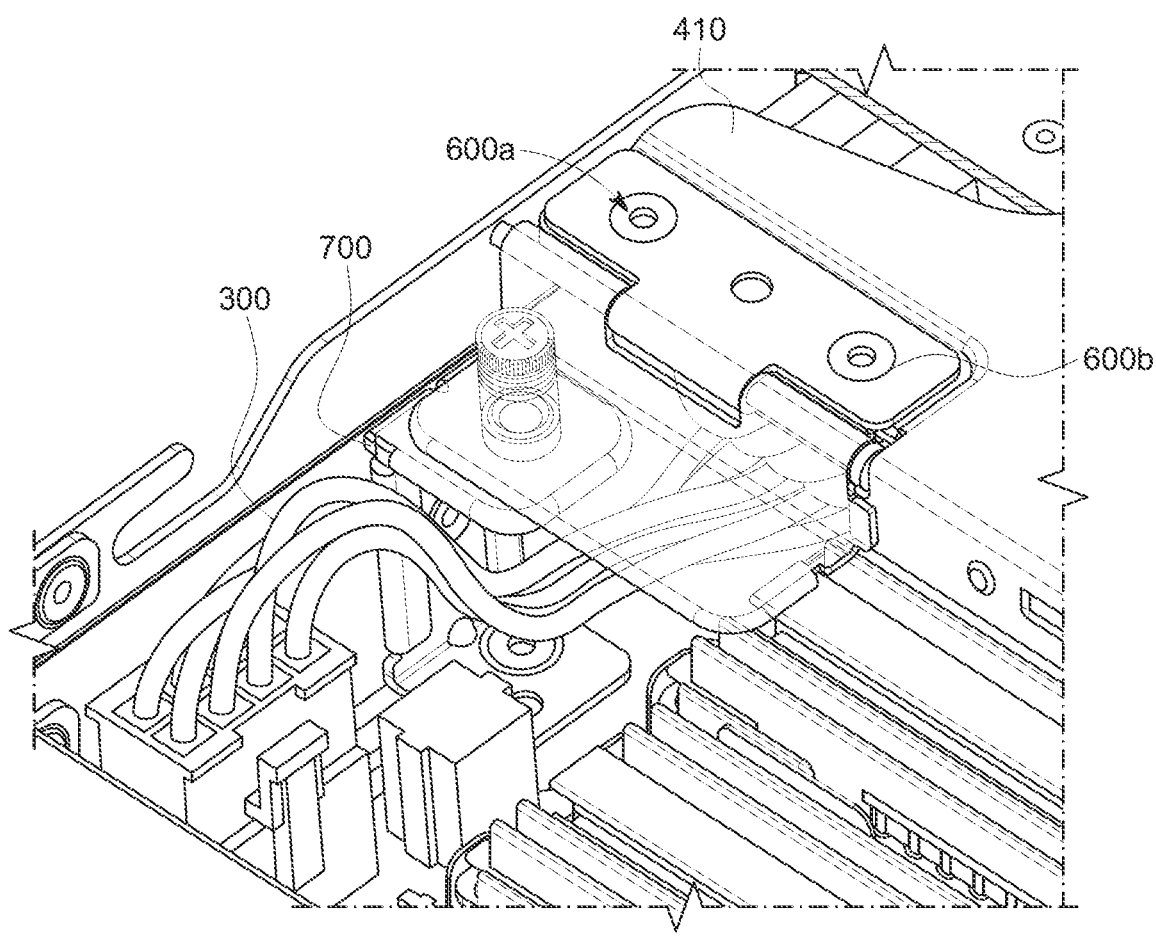
FIGS. 5A and 5B are perspective views of a portion of a riser bracket with a hinge, according to certain aspects of the present disclosure, showing coupling of the hinge to a bracket.
Figure 7A:
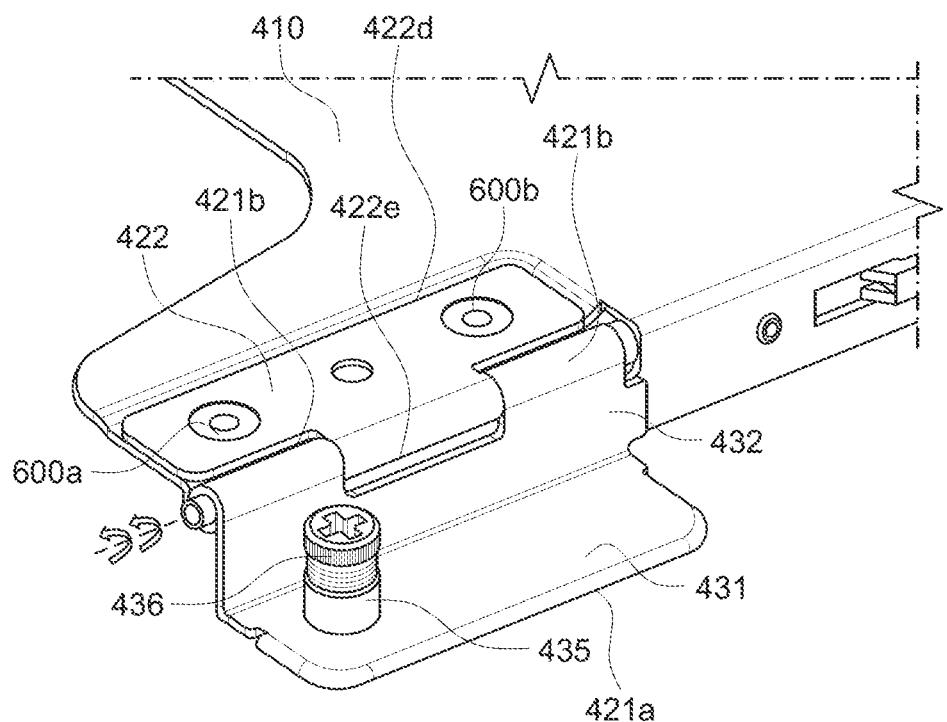
FIGS. 7A and 7B illustrate pivoting of a hinge attached to a riser bracket, according to certain aspects of the present disclosure, the hinge being in a first position in FIG. 7A and the hinge being in a second position in FIG. 7B.

According to various embodiments, the second leaf 422 has a generally flat surface with at least a second hole 441 and a third hole 442 configured to receive a second fastener 600a and a third fastener 600b, respectively, as exemplified in FIGS. 5A and 7A. In some embodiments, the second fastener 600a and the third fastener 600b are the same. In some embodiments, the second fastener 600a and the third fastener 600b include rivets. In some embodiments, the second fastener 600a and the third fastener 600b are different from the first fastener 436.

In some embodiments, the second leaf 422 has a fourth portion 422a and a fifth portion 422b with a same height, as shown in FIG. 3B. The second leaf 422 further has a sixth portion 422c between the fourth portion 422a and the fifth portion 422b, as shown in FIG. 3B. In some embodiments, a height of the sixth portion 422c is greater than the height of the fourth and fifth portions 422a, 422b.

In some embodiments, the second leaf 422 further has a third knuckle 443 at an edge of the sixth portion. The third knuckle 443 is positioned between the first knuckle 433 and the second knuckle 434 such that the first leaf 421 is pivotably coupled to the second leaf 422 by a pin 423 passing through the first, second, and third knuckles 433, 434, 443.

Figure 4A:
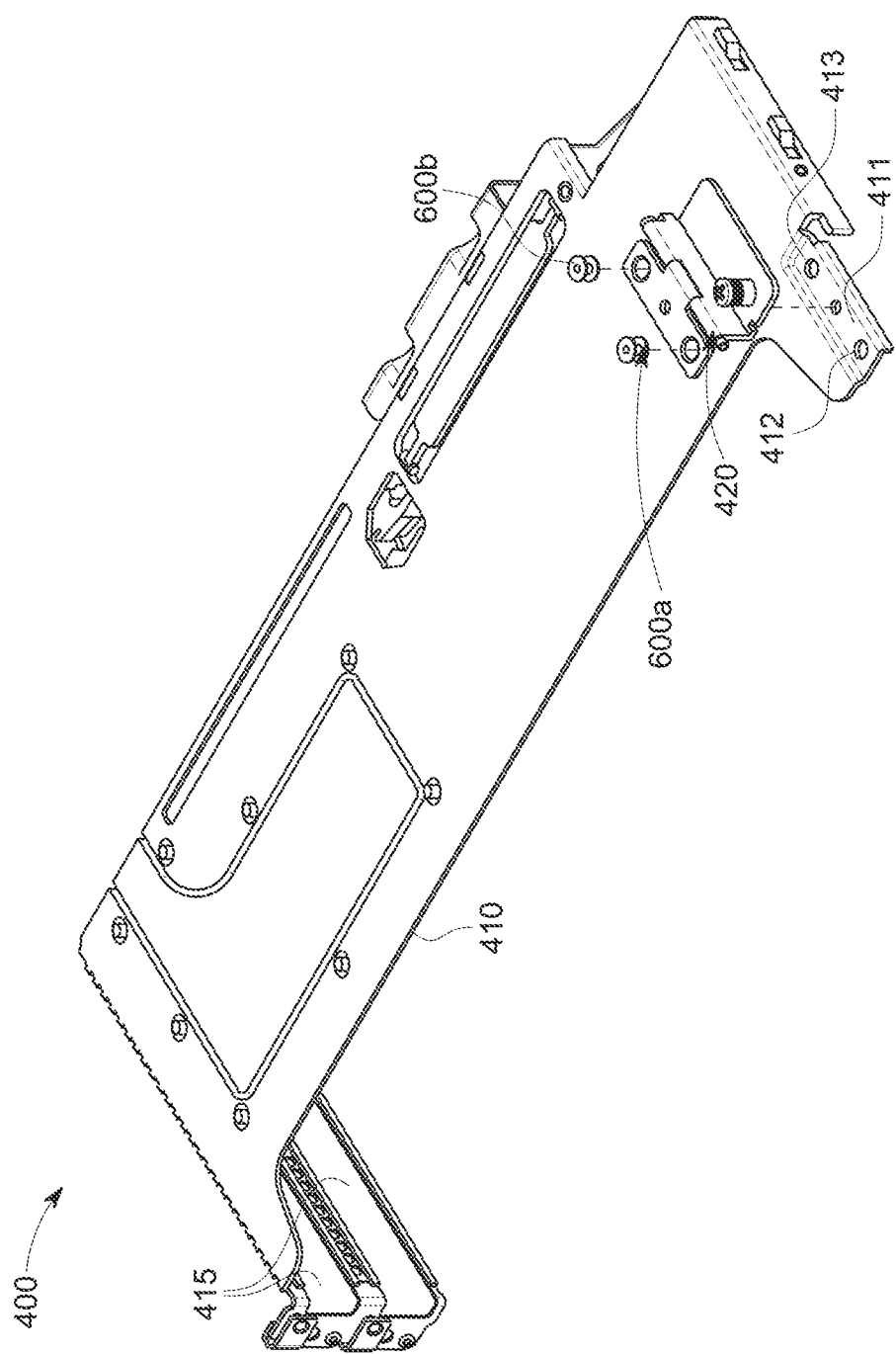
FIG. 4A is an exploded view of a riser bracket and a hinge, according to certain aspects of the present disclosure.
Figure 4B:
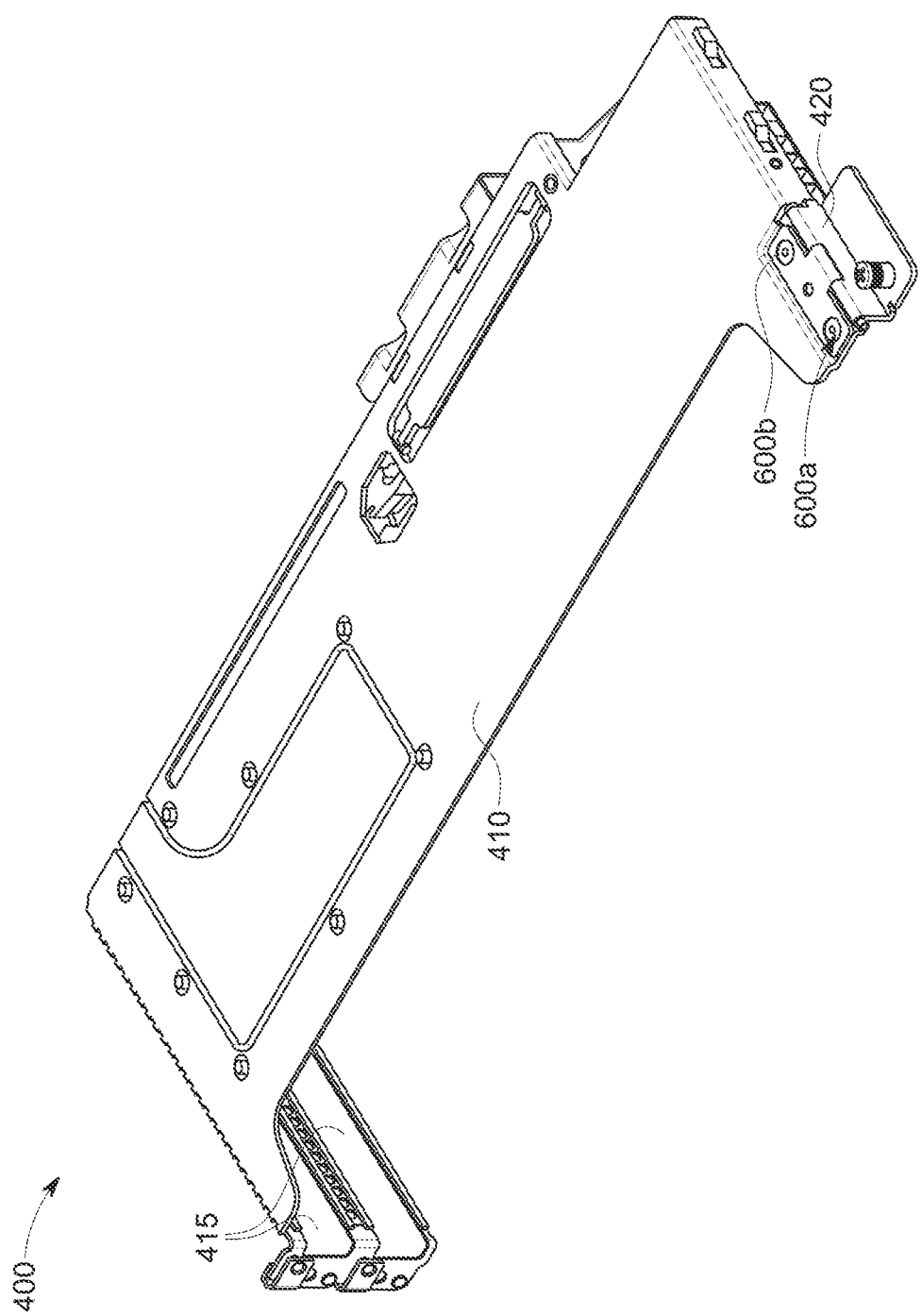
FIG. 4B is a perspective view of the riser bracket shown in FIG. 4A with the hinge attached thereto.

FIGS. 4A and 4B show the overall structure of the flippable riser bracket 400. Referring to FIG. 4A, the riser bracket 410 of the flippable riser bracket 400 has a hinge receiving area 411 for receiving the hinge 420. The hinge receiving area 411 is located on the riser bracket 410 such that when the PCIE card 100 is received in the riser bracket 410, the hinge receiving area 411 is located adjacent to the power connector 101 of the PCIE card 100. Further, in some embodiments, the hinge receiving area 411 is located at an edge portion of one side of the riser bracket 410. Furthermore, in some embodiments, the hinge receiving area 411 is designed such that the top surface of the hinge receiving area 411 is lower than the top surface of the rest of the riser bracket 410.

In some embodiments, the hinge receiving area 411 has through holes 412, 413 corresponding to the second and third holes 441, 442, respectively, of the second leaf 422. As shown in FIG. 4A, to assemble the flippable riser bracket 400, the hinge 420 is placed on top of the hinge receiving area 411 such that the through holes 412, 413 and the second and third holes 441, 442 are aligned. Thereafter, the second fastener 600a and the third fastener 600b are put through the second and third holes 441, 442 to reach the through holes 412, 413, respectively. Eventually, the second fastener 600a and the third fastener 600b couple the second leaf 422 to the hinge receiving area 411 of the riser bracket 410. In some embodiments, the second fastener 600a and the third fastener 600b are releasable fasteners, such as screws or bolts. In some embodiments, the second fastener 600a and the third fastener 600b are rivets.

Figure 5B:
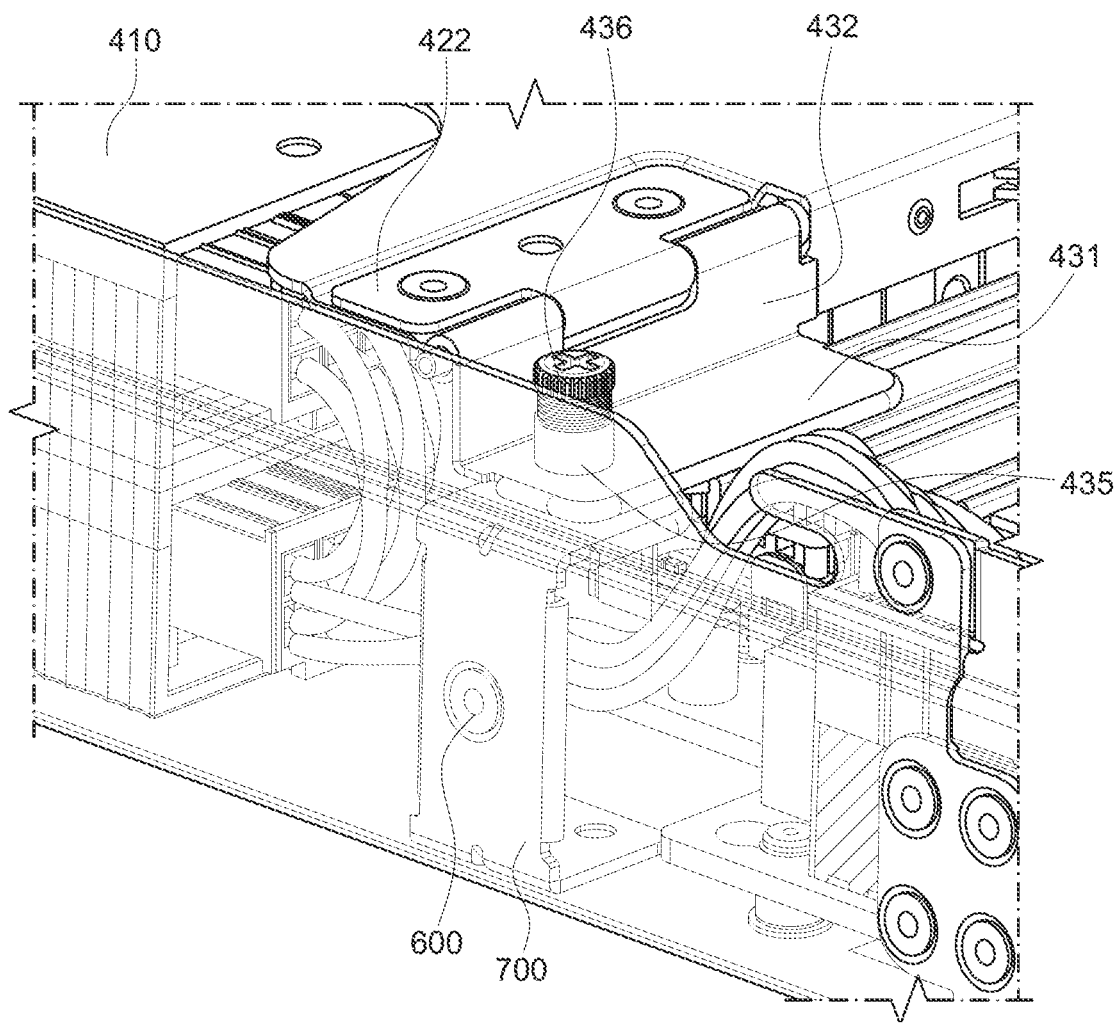

According to various embodiments, the second leaf 422 is fixedly coupled to the hinge receiving area 411 by the second and third fasteners 600a, 600b. For example, the second leaf 422 is fixedly coupled to the hinge receiving area 411 by the second and third fasteners 600a, 600b such as rivets, as shown in FIGS. 5A and 5B. In contrast to the second leaf 422, the first leaf 421 is releasably coupled to the server system 500 via the first fastener 436 passing through the first hole 435 and releasably coupled to a receiving hole 730 shown in FIGS. 6A and 6B. In some embodiments, the receiving hole 730 is provided by a bracket 700 internally attached to the server system 500. In some embodiments, the bracket 700 is fixedly attached to the at least one portion of the server system 500 by a fastener 600. In some embodiments, the fastener 600 is a rivet. In some embodiments, the fastener 600 is the same as the second and third fasteners 600a, 600b.

Figure 6A:
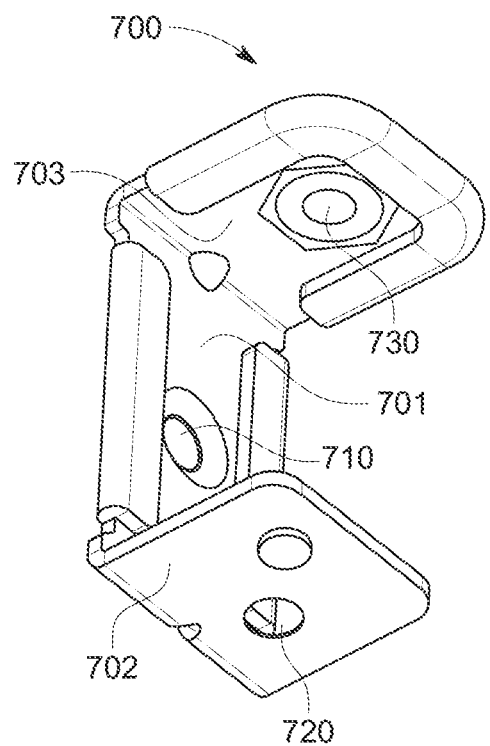
FIGS. 6A and 6B are perspective views of the bracket shown in FIGS. 5A and 5B, according to certain aspects of the present disclosure.
Figure 6B:
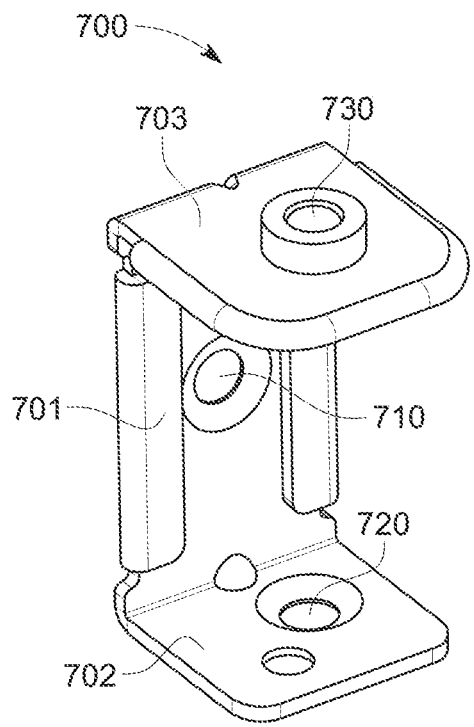

FIGS. 6A and 6B show the structure of the bracket 700 having the receiving hole 730. In general, the bracket 700 has a first side 701 having a through hole 710, a second side 702 and a third side 703 that are parallel and extending generally perpendicular from ends of the first side 701. The second side 702 has a through hole 720, and the third side 703 has the receiving hole 730. In some embodiments, while the holes 710 and 720 are the same, the receiving hole 730 is different from the holes 710, 720. In some embodiments, the receiving hole 730 includes a threaded nut inserted into the third side 703 of the bracket 700, as exemplified in FIGS. 6A and 6B. In some embodiments, the first fastener 436 passes through the first hole 435 and is releasably coupled to the receiving hole 730. For example, the first fastener 436 is a screw or a bolt. Thus, the first fastener 436 may be fastened or unfastened with a tool or fingers.

In some embodiments, the bracket 700 is attached to the server system 500 by the fasteners 600 passing through the through holes 710, 720. In some embodiments, the bracket 700 is fixedly attached to two different sides of the server system 500 by the fasteners, as exemplified in FIGS. 5A and 5B. For example, the fasteners 600 are rivets.

Figure 7B:
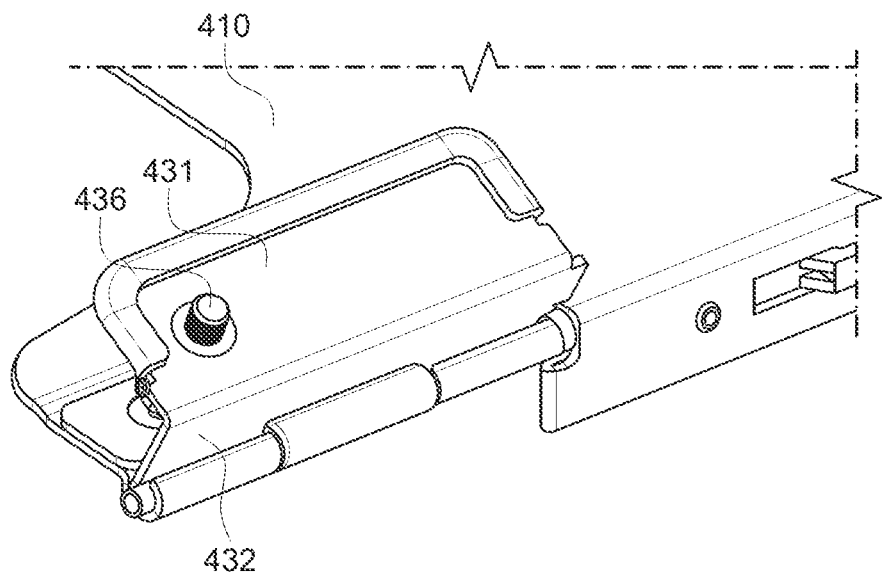

Referring to FIGS. 7A and 7B, the hinge 420 includes the first leaf 421 having a movable end 421a at the first plate 431 and a first hinged end 421b at the second plate 432. The hinge 420 further includes the second leaf 422 having a fixed end 422d and a second hinged end 422e. The first hinged end 421b of the second plate 432 is rotatably coupled with the second hinged end 422e of the second leaf 422. The fixed end 422d of the second leaf 422 is mechanically attached to the riser bracket 410 near the power connector 101 of the PCIE card 100 or attached to the hinge receiving area 411 of the riser bracket 410. The hinge 420 is pivotable between a first position shown in FIG. 7A and a second position shown in FIG. 7B. For example, referring to FIG. 7A, after releasing the first fastener 436 from the hinge 420 in the first position, the first plate 431 is flipped upward to switch to the second position, as shown in FIG. 7B. As exemplified in FIG. 7B, in some embodiments, when the hinge 420 is in the second position, the bottom end portion of the first fastener 436 is exposed and visible from the bottom side of the first plate 431. In some embodiments, the first hole 435 is elongated and threaded such that the first fastener 436 remains within the first hole even when the first fastener is released from the receiving hole 730 of the bracket 700.

As shown in FIGS. 2A, 5A, 5B, and 10B, the hinge 420 covers the internal space of the riser bracket 410 in the first position. Further, as shown in FIGS. 8A, 8B, 9, and 10A, the hinge 420 uncovers the internal space of the riser bracket 410 in the second position.

According to various embodiments, the server system 500 includes the riser bracket 410 having a slot 415 and an internal space. For example, the internal space is an operation space (OS) for allowing a physical user action. See FIG. 9. The server system 500 further includes the PCIE card 100 inserted in the slot 415 of the riser bracket 410, as shown in FIG. 2B.

Figure 8A:
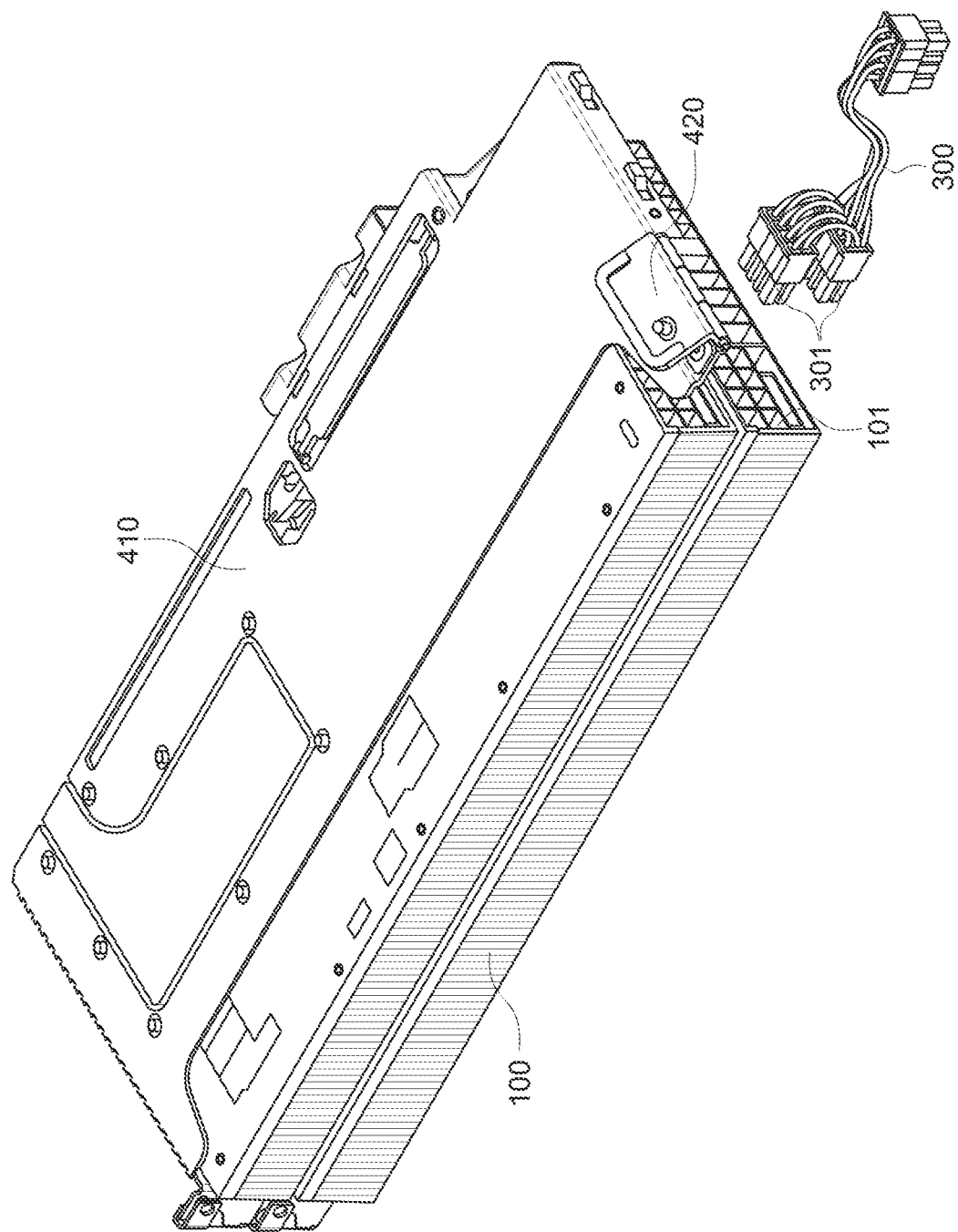
FIGS. 8A and 8B illustrate connecting a plug of cables to a power connector of a PCIE card installed in the riser bracket while the hinge is in the second position, as shown in FIG. 7B, according to certain aspects of the present disclosure.
Figure 8B:
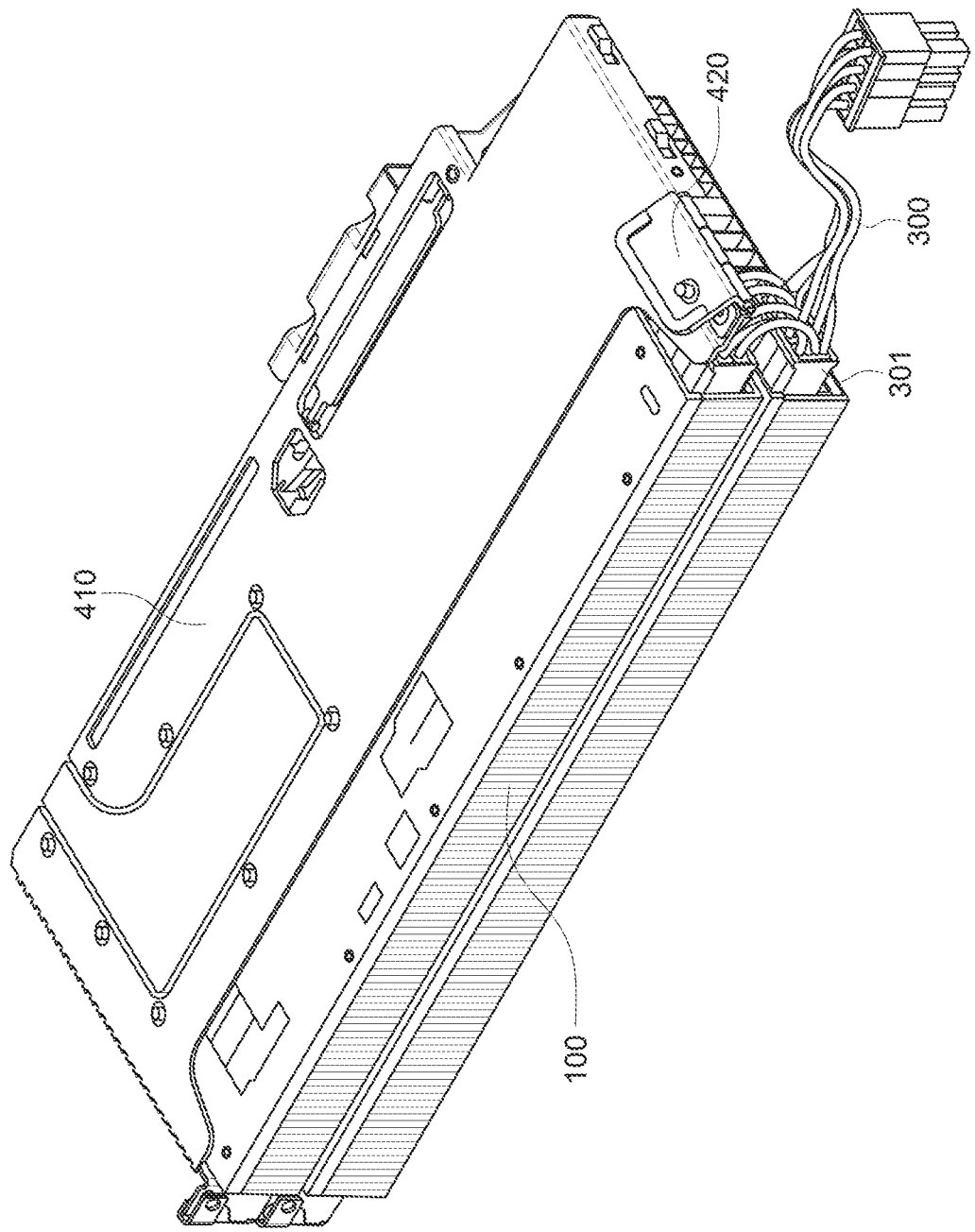
Figure 9:
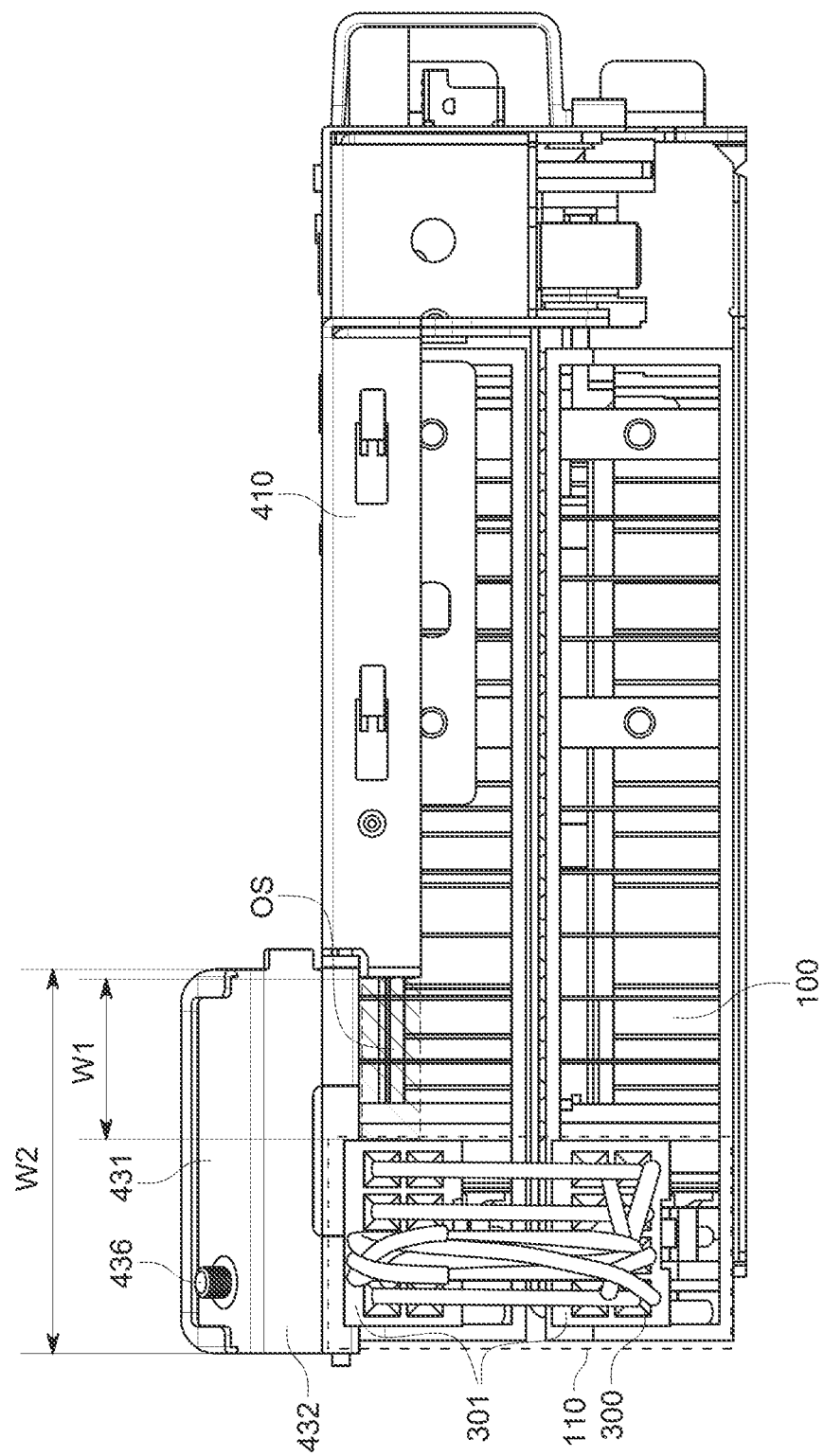
FIG. 9 is a front view of a hinge attached to a riser bracket, according to certain aspects of the present disclosure, a power connector of a PCIE card being exposed when the hinge is in the second position to uncover an internal/operation space adjacent to the power connector.

Referring to FIG. 8A, the PCIE card 100 has a power connector 101, and the power connector 101 is configured to receive a plug 301/power cable 300. In various embodiments, the internal space (OS) of the riser bracket 410 is adjacent to the power connector 101. As shown in FIGS. 8A and 8B, the power connector 101 is exposed and the operation space (OS) is provided by placing the hinge 420 in the second position. That is, not only the power connector 101, but also an additional space next to the power connector is uncovered when the hinge 420 is in the second position, the additional space corresponding to the operation space (OS) shown in FIG. 9. For example, referring to FIG. 9, in some embodiments, the width (W1) of the operation space (OS) is at least 17 mm. In some embodiments, the width (W1) of the operation space (OS) is about 2 cm, about 2.5 cm, or about 3 cm. Further, in some embodiments, the width (W2) of the hinge 420 or first plate 431 is at least 40 mm. In some embodiments, the width (W2) of the hinge 420 or first plate 431 is about 4 cm, about 4.5 cm, or about 5 cm. The width (W2) of the hinge 420 generally corresponds to or is slightly greater than the sum of the width of the power connector 101 and the width (W1) of the operation space (OS). The operation space (OS) accessible by a technician when the hinge 420 is in the second position is shown in FIG. 9. The operation space (OS) allows fingers of the technician holding the plug 301 to access the power connector 101 without any interference. Thus, as shown in FIGS. 8B and 9, the plug 301 of the power cable(s) 300 can be easily coupled to the power connector 101 of the PCIE card 100.

Referring to FIGS. 8B and 9, the technician may also easily access the plug 301 of the power cable(s) 300 coupled to the power connector 101 by placing the hinge 420 in the second position to unplug the plug 301 from the power connector 101.

Figure 10A:
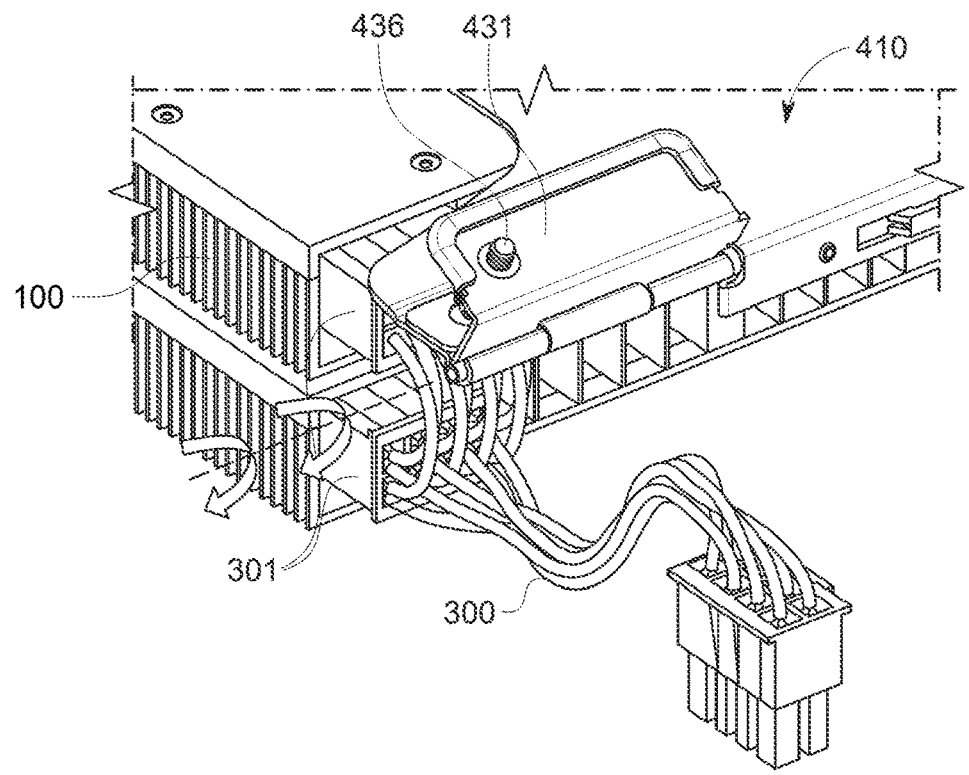
FIGS. 10A and 10B illustrate pivoting of a hinge attached to a riser bracket after connecting a power cable to a power connector of a PCIE card, according to certain aspects of the present disclosure, the hinge being in a second position in FIG. 10A and the hinge being in a first position in FIG. 10B.
Figure 10B:
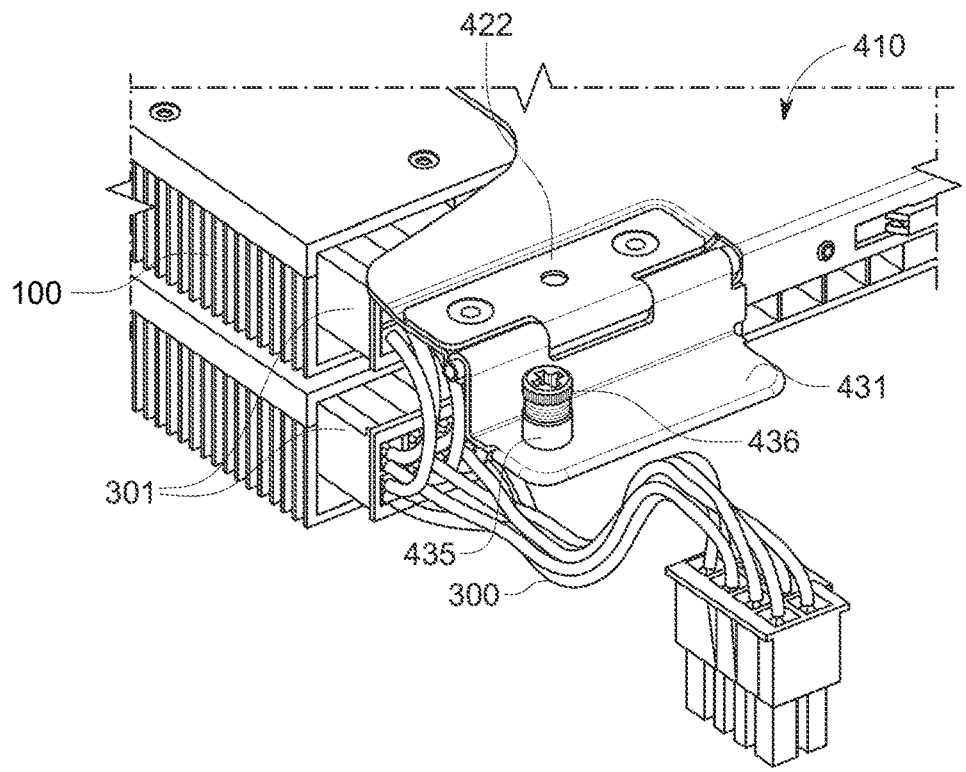

Referring to 10A, once the plug 301 is coupled to the power connector 101, the first plate 431 is flipped downward to switch to the first position, as shown in FIG. 10B.

According to various embodiments, a server system 500 includes a PCIE card 100, a riser bracket 410 having a slot 415 in which the PCIE card 100 is received, and a hinge 420 coupled to a portion of the riser bracket 410. See FIGS. 2A, 2B, 5A, 5B, 9, 10A, and 10B. In some embodiments, the PCIE card 100 includes a power connector 101 configured to receive a plug 301/power cable 300, as shown in FIG. 8A. The hinge 420 is pivotable between a first position and a second position, as shown in FIGS. 7A and 7B, respectively. The portion of the riser bracket 410 to which the hinge 420 is coupled is adjacent to the power connector 101, as shown in FIGS. 8A, 8B, and 9. A portion 110 of the PCIE card 100 is covered in the first position, as shown in FIG. 10B, the portion 110 of the PCIE card 100 being near the power connector(s) 101 and/or the plug(s) 301, as shown in FIG. 9. In some embodiments, both plugs 301 shown in FIG. 9 are covered when the hinge 420 is in the first position. In other embodiments, the height portion 110 of the PCIE card 100 may be less than the height shown in FIG. 9 such that a portion of one of the plugs 301 shown in FIG. 9 are partially exposed even when the hinge 420 is in the first position. In some embodiments, at least one of the plugs 301 shown in FIG. 9 is completely covered by the hinge 420 in the first position. The hinge 420 exposes the portion 110 of the PCIE card 100 in the second position, as shown in FIGS. 8A, 8B, 9, and 10A.

According to various embodiments, the hinge 420 includes a first leaf 421 and a second leaf 422 rotatably coupled with the first leaf 421, as shown in FIGS. 3A and 3B. The second leaf 422 is fixedly attached to the riser bracket 410 near the power connector 101, as shown in FIGS. 5B, 8A, and 10B. The first leaf 421 is rotatable to place the hinge 420 in the first or second position, as shown in FIGS. 7A and 7B, respectively.

According to various embodiments, first leaf 421 is releasably coupled to a portion of the server system 500 such that the hinge 420 is in the first position, as shown in FIGS. 5A and 5B. The first leaf 421 is uncoupled from the portion of the server system 500 to place the hinge 420 in the second position, as shown in FIGS. 7A and 7B.

According to various embodiments, a method for connecting a power cable 300 to a power connector 101 of a PCIE card 100 within a server system 500 includes unfastening a fastener 436 from a through hole 435 on a first leaf 421 of a hinge 420 and a receiving hole 730 to pivot the hinge 420 from a first position to a second position. See FIGS. 5B, 7A, and 7B. A second leaf 422 of the hinge 420 is fixedly attached to a portion of the riser bracket 410, as shown in FIGS. 5A, 5B, and 7A. However, in some embodiments, the second leaf 422 is releasably attached to the riser bracket 410.

The method further includes pivoting the hinge 420 attached to the riser bracket 410, the riser bracket 410 including a slot 415 configured to receive the PCIE card 100, from a first position to a second position, as shown in FIGS. 7A and 7B. Then, a portion of the PCIE card 100 adjacent to the power connector 101 is exposed. Next, the method further includes, accessing an internal space or operation space (OS) near the exposed portion of the PCIE card 100 with a plug 301 of the power cable 300 while the hinge 420 is in the second position, as shown in FIGS. 8A, 8B, and 9.

Next, the method further includes connecting the plug 310 to the power connector 101 of the PCIE card 100 while the hinge 420 is in the second position, as shown in FIGS. 8A and 8B.

Next, the method further includes pivoting the hinge 420 from the second position to the first position when the plug 310 is connected to the power connector 101 of the PCIE card 100 such that the portion of the PCIE card 100 is covered by the hinge 420 in the first position, as shown in FIGS. 10A and 10B. The portion of the PCIE card 100 is not accessible while the hinge 420 is in the first position.

Optionally, the method further includes fastening the fastener 436 into the receiving hole 730, following the pivoting of the hinge 420 from the second position to the first position, as shown in FIGS. 10A and 10B. This will prevent accidental pivoting of the hinge 420, thus avoiding damages to the PCIE card 100.

Although the disclosed embodiments have been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular examples only and is not intended to be limiting of the disclosure. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this disclosure belongs. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

While various embodiments of the present disclosure have been described above, it should be understood that they have been presented by way of example only, and not limitation. Numerous changes to the disclosed embodiments can be made in accordance with the disclosure herein, without departing from the spirit or scope of the disclosure. Thus, the breadth and scope of the present disclosure should not be limited by any of the above described embodiments. Rather, the scope of the disclosure should be defined in accordance with the following claims and their equivalents.

What is claimed is:

1. A server system comprising:
    a riser bracket having a slot and an internal space, the internal space being an operation space for allowing a physical user action, the slot extending along a width of the riser bracket, the internal space extending along the width of the riser bracket;
    a Peripheral Component Interconnect Express (PCIE) card inserted in the slot of the riser bracket in an insertion direction that is generally parallel to the slot, the PCIE card having a power connector, the power connector being configured to receive a power cable, the internal space being adjacent to the power connector; and
    a hinge mechanically coupled to and extending only along a corner area of a top plate of the riser bracket near the power connector, the hinge being pivotable between a first position and a second position, the hinge covering the internal space in the first position, the hinge uncovering the internal space in the second position, the hinge including:
        a first leaf bent to have a first plate and a second plate, the second plate extending generally perpendicularly from one end of the first plate, the first plate having a movable end and the second plate having a first hinged end, the first plate being generally parallel to the top plate in the first position and generally perpendicular in the second position, the first plate having a first hole configured to receive a first fastener, the first fastener being coupled to a bracket of the server system in the first position, the second plate having at the first hinged end a first knuckle that is spaced from a second knuckle, and
        a second leaf having a fixed end and a second hinged end, the first hinged end being rotatably coupled with the second hinged end, the fixed end being mechanically attached to the corner area of the top plate of the riser bracket, the second leaf having a third knuckle at the second hinged end that is positioned between the first knuckle and the second knuckle to form a contiguous enclosed through-hole through which a pin passes to rotatably couple the first leaf and the second leaf.

2. The server system of claim 1, wherein the movable end covers the internal space in the first position, the movable end uncovering the internal space in the second position.

3. The server system of claim 1, wherein the first leaf and the second leaf have different shapes and different dimensions.

4. The server system of claim 1, wherein the first hole is threaded, and the first fastener includes a screw.

5. The server system of claim 1, wherein the second leaf has a generally planar surface with at least a second hole and a third hole configured to receive a second fastener and a third fastener, respectively.

6. The server system of claim 5, wherein the second fastener and the third fastener include rivets and are different from the first fastener.

7. The server system of claim 6, wherein the second leaf is fixedly coupled to a top side of the riser bracket via the second and third fasteners.

8. The server system of claim 7, wherein the first leaf is releasably coupled to the server system via the first fastener passing through the first hole and releasably coupled to a receiving hole.

9. The server system of claim 8, wherein the bracket includes the receiving hole configured to receive the first fastener.

10. The server system of claim 9, wherein the receiving hole includes a threaded nut.

11. The server system of claim 8, wherein:
the first leaf is coupled to the server system via the first fastener while the hinge is in the first position; and
the first fastener is released from the receiving hole such that the first leaf is not coupled to the server system so as to place the hinge in the second position.

12. A server system comprising:
a Peripheral Component Interconnect Express (PCIE) card;
a riser bracket having a slot in which the PCIE card is received, the PCIE card including a power connector configured to receive a power cable; and
a hinge coupled to and extending only along a corner area of a top plate of the riser bracket near the power connector, the hinge being pivotable between a first position and a second position, a portion of the PCIE card being covered in the first position, the portion of the PCIE card being near the power connector, the hinge exposing the portion of the PCIE card in the second position, the hinge including:
a first leaf bent to have a first plate and a second plate, the second plate extending generally perpendicularly from one end of the first plate, the first plate having a movable end and the second plate having a first hinged end, the first plate being generally parallel to the top plate in the first position and generally perpendicular in the second position, the first plate having a first hole configured to receive a first fastener, the first fastener being coupled to a bracket of the server system in the first position, the second plate having at the first hinged end a first knuckle that is spaced from a second knuckle, and
a second leaf having a fixed end and a second hinged end, the first hinged end being rotatably coupled with the second hinged end, the fixed end being mechanically attached to the corner area of the top plate of the riser bracket, the second leaf having a third knuckle at the second hinged end that is positioned between the first knuckle and the second knuckle to form a contiguous enclosed through-hole through which a pin passes to rotatably couple the first leaf and the second leaf.

13. The server system of claim 12, wherein the first leaf is releasably coupled to the bracket of the server system such that the hinge is in the first position, and wherein the first leaf is uncoupled from the bracket of the server system to place the hinge in the second position.

* * * * *